(12) United States Patent
Tripathy et al.

(10) Patent No.: US 10,570,228 B2
(45) Date of Patent: Feb. 25, 2020

(54) HIGH SOFTENING POINT HYDROCARBON RESINS

(71) Applicant: ExxonMobil Chemical Patents Inc., Baytown, TX (US)

(72) Inventors: Ranjan Tripathy, Sugar Land, TX (US); Thomas R. Barbee, Kingwood, TX (US); Edward J. Blok, Huffman, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 134 days.

(21) Appl. No.: 15/572,188

(22) PCT Filed: Jun. 1, 2016

(86) PCT No.: PCT/US2016/035222
§ 371 (c)(1),
(2) Date: Nov. 7, 2017

(87) PCT Pub. No.: WO2017/014839
PCT Pub. Date: Jan. 26, 2017

(65) Prior Publication Data
US 2018/0127527 A1 May 10, 2018

Related U.S. Application Data

(60) Provisional application No. 62/194,492, filed on Jul. 20, 2015.

(30) Foreign Application Priority Data

Aug. 26, 2015 (EP) .................................... 15182586

(51) Int. Cl.
| | |
|---|---|
| *C08L 9/00* | (2006.01) |
| *C08F 212/08* | (2006.01) |
| *C08L 21/00* | (2006.01) |
| *C08F 236/04* | (2006.01) |
| *B60C 1/00* | (2006.01) |
| *C08F 236/20* | (2006.01) |
| *C08F 2/04* | (2006.01) |
| *C08F 232/08* | (2006.01) |
| *C08L 25/10* | (2006.01) |

(52) U.S. Cl.
CPC .............. *C08F 212/08* (2013.01); *B60C 1/00* (2013.01); *B60C 1/0008* (2013.01); *B60C 1/0016* (2013.01); *B60C 1/0025* (2013.01); *C08F 2/04* (2013.01); *C08F 232/08* (2013.01); *C08F 236/04* (2013.01); *C08F 236/045* (2013.01); *C08F 236/20* (2013.01); *C08L 9/00* (2013.01); *C08L 21/00* (2013.01); *C08L 25/10* (2013.01)

(58) Field of Classification Search
CPC .............. C08F 9/00; C08F 9/06; C08F 25/10
See application file for complete search history.

(56) References Cited

U.S. PATENT DOCUMENTS

| | | | | |
|---|---|---|---|---|
| 3,895,081 | A | * | 7/1975 | Aikawa .................... C08F 36/00 526/237 |
| 3,939,131 | A | * | 2/1976 | Morikawa ............. C08F 236/20 526/281 |
| 4,197,150 | A | | 4/1980 | Breidt, Jr. et al. |
| 4,482,688 | A | | 11/1984 | Schluenz |
| 5,312,870 | A | | 5/1994 | Williams |
| 6,136,923 | A | | 10/2000 | Cheung et al. |
| 6,313,241 | B1 | | 11/2001 | Gauthier et al. |
| 6,462,161 | B1 | | 10/2002 | Cady et al. |
| 7,431,061 | B2 | | 10/2008 | Mathieu et al. |
| 7,928,162 | B2 | | 4/2011 | Kiss et al. |
| 8,816,032 | B1 | | 8/2014 | Flook |
| 9,868,807 | B2 | | 1/2018 | Blok et al. |
| 2010/0036038 | A1 | | 2/2010 | Rodgers et al. |
| 2013/0184397 | A1 | * | 7/2013 | Blok ......................... B60C 1/00 524/518 |
| 2013/0211027 | A1 | * | 8/2013 | Barbee .................. C08F 232/06 526/283 |

FOREIGN PATENT DOCUMENTS

| | | |
|---|---|---|
| EP | 0 273 654 A | 7/1988 |
| JP | 54030283 A | 3/1979 |
| JP | 62241944 A | 10/1987 |
| JP | S6315810 A | 1/1988 |
| JP | 2004346154 A | 12/2004 |
| JP | 2006063237 A | 3/2006 |
| WO | 88/04674 A | 6/1988 |

* cited by examiner

*Primary Examiner* — Rip A Lee

(57) ABSTRACT

A hydrocarbon polymer modifier (HPM) is an interpolymer of (i) a vinyl cyclohexene component (ii) a piperylene component; and (iii) a $C_8$-$C_{12}$ vinyl aromatic component; and wherein the interpolymer comprises (a) a softening point from 40° C. to 160° C., (b) Mn greater than 400, (c) Mz less than 15,000, and (d) at least 8 mole percent aromatic hydrogen, based on the total moles of hydrogen in the interpolymer.

18 Claims, 1 Drawing Sheet

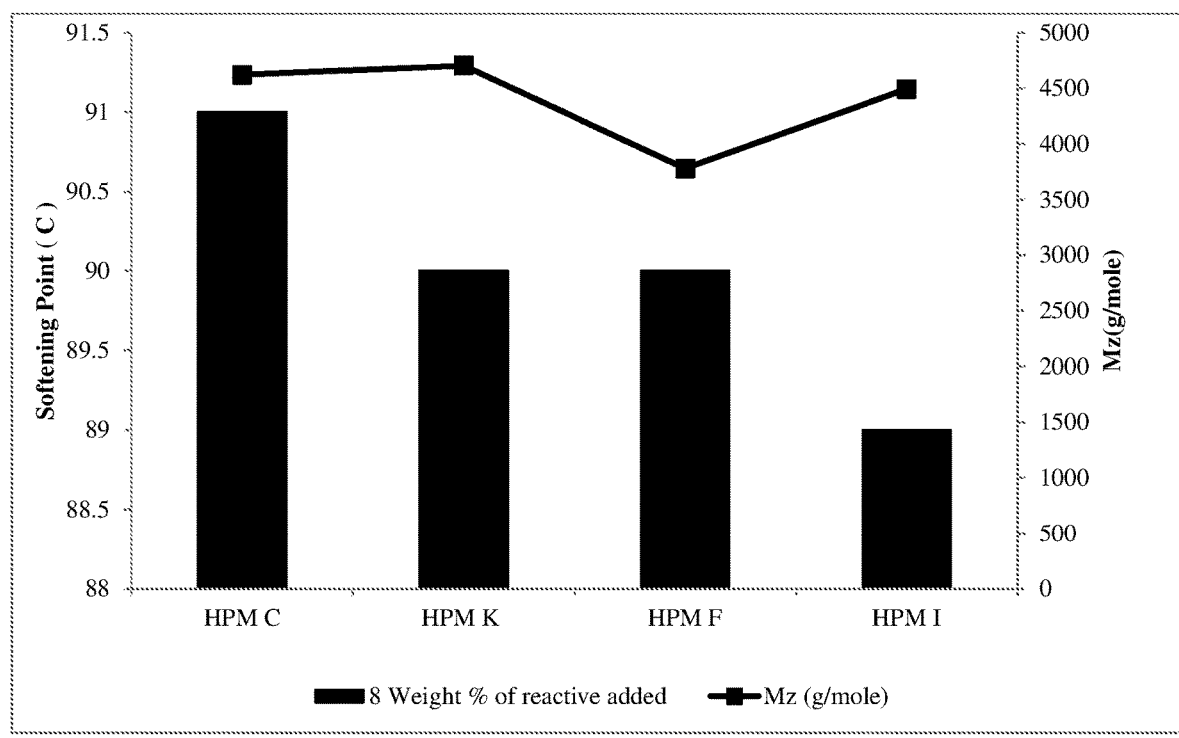

HIGH SOFTENING POINT HYDROCARBON RESINS

PRIORITY

This application is a National Phase Application claiming priority to PCT Application Serial No. PCT/US2016/035222 filed Jun. 1, 2016, Provisional Application No. 62/194,492, filed Jul. 20, 2015, and EP Application No. 15182586.6, filed Aug. 26, 2015, the disclosures of which are incorporated herein by reference.

FIELD OF THE INVENTION

This invention relates to hydrocarbon polymer modifiers and their use in elastomeric compositions. More particularly, this invention relates to hydrocarbon polymer modifiers having a balance of properties including high softening point with narrow molecular weight distribution change.

BACKGROUND

Hydrocarbon resins are used in a variety of applications. In elastomeric compositions, for example, hydrocarbon resins are used as a processing aid and to improve the characteristics of elastomeric composition, e.g., in tire components, such as treads and sidewalls, hoses, belts, footwear components, and vibration isolation devices. The selection of ingredients for the commercial formulation of an elastomeric composition depends upon the balance of properties desired, the application, and the end use for the particular application.

Generally, the raw ingredients and materials used in tire compounding impact all tire performance variables, thus, the ingredients must be compatible with the rubbers, not interfere with cure, be easily dispersed in all tire compounds, be cost effective, and not adversely impact tire performance. Rolling resistance, dry and wet skid characteristics, heat buildup, and so on, are important performance characteristics, as well as the ability to improve the endurance of tires used in a wide variety of conditions, such as is required for agricultural tires, aircraft tires, earthmover tires, heavy-duty truck tires, mining tires, motorcycle tires, medium truck tires, and passenger car tires. On the other hand, maintaining ease of processability of the uncured elastomeric composition is also of significant importance. Additionally, the goals of improving air impermeability properties, flex fatigue properties, and the adhesion of the elastomeric composition to adjoining tire components without affecting the processability of the uncured elastomeric composition or while maintaining or improving the physical property performance of the cured elastomeric composition still remain.

Conventionally, various monomers are added to the feed stream to prepare the hydrocarbon polymer modifier (HPM) to achieve target properties to be suitable in the above-mentioned tire applications. It is generally known that cyclopentadiene-based monomers are often used in HPMs for tire applications to increase the softening point (SP) of the HPM, and therefore improve the miscibility of the formulations (and therefore the rolling resistance and grips). However, the addition of cyclopentadiene-based monomers can increase the molecular weight distribution (MWD) or z-average molecular weight (Mz) of the HPM, which may cause the HPM to migrate to the surface of a tire component over time. Therefore, a need exists for an alternative HPM formulation having improved softening point characteristics without increasing the MWD.

BRIEF DESCRIPTION OF THE FIGURE

FIG. 1 shows softening point and z-average Molecular Weight for 4 HPMs having different monomer contents.

SUMMARY

The present invention is directed to a hydrocarbon polymer modifier (HPM) having high softening point, is an interpolymer of (i) a vinyl cyclohexene component (ii) a piperylene component; and (iii) a $C_8$-$C_{12}$ vinyl aromatic component; and wherein the interpolymer comprises (a) a softening point from 40° C. to 160° C., (b) Mn greater than 400, (c) Mz less than 15,000, and (d) at least 8 mole percent aromatic hydrogen, based on the total moles of hydrogen in the interpolymer.

DETAILED DESCRIPTION

The present invention provides a hydrocarbon polymer modifier ("HPM") which can be useful, for example, in an elastomeric composition. Elastomeric compositions comprising the HPM are useful in a variety of applications, such as pneumatic tire components, hoses, belts, solid tires, footwear components, rollers for graphic arts applications, vibration isolation devices, pharmaceutical devices, adhesives, sealants, protective coatings, and bladders for fluid retention and curing purposes. The HPM in an embodiment can be prepared having a balance of softening point (SP) or glass transition temperature (Tg), molecular weight, and molecular weight distribution.

Various specific embodiments, versions, and examples are described herein, including exemplary embodiments and definitions that are adopted for purposes of understanding the claimed invention. While the following detailed description gives specific preferred embodiments, those skilled in the art will appreciate that these embodiments are exemplary only, and that the invention can be practiced in other ways. For purposes of determining infringement, the scope of the invention will refer to any one or more of the appended claims, including their equivalents, and elements or limitations that are equivalent to those that are recited. Any reference to the "invention" may refer to one or more, but not necessarily all, of the inventions defined by the claims.

All hydrocarbon polymer modifier (HPM) component percentages listed herein are weight percentages, unless otherwise noted. "Substantially free" of a particular component in reference to a composition is defined to mean that the particular component comprises less than 0.5 weight percent in the composition, or more preferably less than 0.25 weight percent of the component in the composition, or most preferably less than 0.1 weight percent of the component in the composition.

The term "elastomer" as used herein refers to any polymer or combination of polymers consistent with the ASTM D1566 definition, incorporated herein by reference. As used herein, the term "elastomer" may be used interchangeably with the term "rubber."

The elastomeric compositions of the invention can include various elastomers, hydrocarbon polymer modifiers, and fillers. Preferably, the elastomeric composition comprises from 5 to 50 phr of hydrocarbon polymer modifier or hydrocarbon polymer modifier blend. In one embodiment, a single one or a mixture of two or more of the various elastomers are generally present in the elastomeric composition at 100 phr with hydrocarbon polymer modifier being present from 5 to 50 phr.

In one embodiment, there is only one interpolymer in the hydrocarbon polymer modifier. In another embodiment, two or more interpolymers may be blended. When two or more interpolymers are used, either at least one of the interpolymers, or the resulting blended hydrocarbon polymer modifier, preferably both, may preferably comprise from 10 to 70 wt % units derived from at least one piperylene component, from 10 to 60 wt % units derived from at least one cyclic pentadiene component, and from 10 to 30 wt % units derived from at least one vinyl cyclohexene components. In an embodiment, the hydrocarbon polymer modifier blend is substantially free of styrene, indene, mesitylene, and norbornene components.

In one embodiment, the elastomeric composition is used in a tire, such as in the tread, or other tire component. In tire construction and model tread formulations, the elastomeric composition may comprise: 100 phr of elastomer(s); from 50 phr to 90 phr of fillers, such as, for example, carbon black and/or silica; from 5 to 50 phr of hydrocarbon polymer modifier(s); optionally, about 0.5 to 3 phr of ZnO; optionally, about 1 phr of stearic acid; optionally, about 1 to 4 phr of accelerators; optionally, about 1 to 2 phr of sulfur; optionally, up to about 5 phr of other processing aids; and optionally, depending on the application, about 0.5 to 4 phr of antidegradants.

In some embodiments, the hydrocarbon polymer modifier(s) can be used in addition to other processing aids and oils, or as a replacement for other processing aids and oils. Preferably, the elastomeric compositions are substantially free of aromatic oils. Substantially free of aromatic oils is defined to mean that the elastomeric composition comprises less than 0.5 phr of aromatic oil, or more preferably less than 0.25 phr of aromatic oil, or most preferably less than 0.1 phr of aromatic oil. Aromatic oils are compounds containing at least 35% by mass of single- and multiple-ring compounds. Generally, aromatic oils contain aromatically unsaturated polycyclic components.

In some embodiments, the hydrocarbon polymer modifiers can be miscible or immiscible in the elastomer Immiscibility can result, for example, where the solubility parameters of the elastomer and the HPM are sufficiently different, i.e., the HPM is incompatible with the elastomer. In another embodiment, the HPM can have a sufficiently high molecular weight to confer immiscibility in an elastomeric matrix, even where the HPM would be compatible with the elastomer mix due to similar solubility parameters and otherwise miscible if the molecular weight were lower.

In some embodiments, the HPM is cocurable or cocured with the elastomer. The HPM in one embodiment comprises olefinic unsaturation or other functionality that facilitates participation in the crosslinking or vulcanization of the rubber mixture. In one embodiment, the HPM is cocurable or cocured with a filler in the elastomeric composition, for example, with silica filler. Cocuring the HPM, which can be either miscible or immiscible in the elastomer, can inhibit migration of the HPM to a surface of the cured rubber article, thus allowing the rubber composition to retain its desired properties for a longer period of time up to the useful lifetime of the article.

Hydrocarbon Polymer Modifiers ("HPM")

As used herein, reference to monomers in the HPM interpolymer is understood to refer to the as-polymerized units derived from that monomer. The terms "polymer" and "interpolymer" are used broadly herein and in the claims to refer to compounds that include, in addition to high molecular weight species that meet the lower molecular weight limits for polymers according to standard ASTM definitions, higher oligomers having a number average molecular weight (Mn) equal to or greater than 400.

HPMs can be used as elastomer compounding materials. Depending on how the HPM is compounded, optimization of rubber characteristics for rubber and tire durability, traction, and abrasion resistance can be achieved. The macrostructure (molecular weight, molecular weight distribution, and branching) of the HPM provides unique properties to the polymer additive. In an embodiment, the HPM includes a vinyl cyclohexene component, a piperylene and/or cyclic component, and optionally a raffinate component.

In an embodiment, the nonaromatic components include piperylene-based components. Piperylene components are generally a distillate cut or synthetic mixture of $C_5$ diolefins, which include, but are not limited to, cis-1,3-pentadiene, trans-1,3-pentadiene, and mixed 1,3-pentadiene. In general, piperylene components do not include branched $C_5$ diolefins such as isoprene. The piperylene component may be supplied in one embodiment as a mixed distillate cut or synthetic mixture comprising up to 20 wt % or up to 30 wt % of other components, such as, for example, 10-20 wt % cyclopentene, 10-20 wt % inert hydrocarbons, and optionally relatively minor amounts of one or more other olefins and diolefins such as 2-methylbutene-1, 2-methylbutene-2, pentene-1, pentene-2, 2-methylpentene-1, 4-methylpentene-1, 3-methylpentadiene-1,4, cyclopentadiene, hexene-1, hexene-2, hexene-3, methylcyclopentadiene, and the like. As used herein in reference to piperylene, aromatic, styrenic, amylene, cyclic pentadiene components, and the like, "inert hydrocarbons" are defined as saturated hydrocarbons or hydrocarbons which are otherwise essentially non-polymerizable in carbocationic polymerization systems, e.g., the inert compounds have a reactivity ratio relative to cyclopentadiene less than 0.01. As used herein, "minor amounts" of the other olefins and diolefins refer to less than 8 wt % of the individual olefin or diolefin, preferably less than 4 wt %, preferably less than 3 wt %, preferably less than 2 wt %, more preferably less than 1 wt %, more preferably less than 0.1 wt %, and more preferably less than 0.01 wt % by weight of the piperylene component.

In one embodiment, the HPM is prepared from a monomer mix having from 10 wt % to 70 wt % piperylene components, or with a range of piperylene components from any lower limit selected from 10 wt %, 20 wt %, 25 wt %, 30 wt %, 35 wt %, 40 wt %, 45 wt %, or 50 wt % piperylene components up to any higher upper limit selected from 70 wt %, 65 wt %, 60 wt %, 55 wt %, 50 wt %, 45 wt %, 40 wt %, or 35 wt % piperylene components, by weight of the total monomers in the monomer mixture. In a particularly preferred embodiments, the HPM is prepared from a monomer mix comprising from 30 wt % to 65 wt % piperylene components, or from 30 wt % to 50 wt % piperylene components, or from 30 wt % to 40 wt % piperylene components, or from 50 wt % to 65 wt % piperylene components.

Raffinate components are generally one or more olefins and diolefins such as 2-methylbutene-1, 2-methylbutene-2, pentene-1, pentene-2, 2-methylpentene-1, 4-methylpentene-1, 3-methylpentadiene-1,4, cyclopentadiene, hexene-1, hexene-2, hexene-3, methylcyclopentadiene, and the like.

Cyclic components are generally a distillate cut or synthetic mixture of $C_5$ and $C_6$ cyclic olefins, diolefins, dimers, codimers, and trimers, etc., therefrom. Cyclics include, but are not limited to, cyclopentene, cyclopentadiene (CPD), dicyclopentadiene (DCPD), cyclohexene, 1,3-cycylohexadiene, 1,4-cyclohexadiene, methylcyclopentadiene (MCPD), di(methylcyclopentadiene) (MCPD dimer), and codimers of CPD and/or MCPD with $C_4$'s such as butadienes, $C_5$'s such as piperylenes, and the like. A preferred cyclic is cyclopentadiene. The dicyclopentadiene may be in either the endo or exo form. The cyclics may or may not be substituted. Preferred substituted cyclics include cyclopentadienes and dicyclopentadienes substituted with a $C_1$ to $C_{40}$ linear, branched, or cyclic alkyl group, preferably one or more methyl groups. In one embodiment, the cyclic components are selected from the group consisting of: cyclopentadiene, cyclopentadiene dimer, cyclopentadiene-$C_4$ codimer, cyclopentadiene-$C_5$ codimer, cyclopentadiene-methylcyclopentadiene codimer, methylcyclopentadiene-$C_4$ codimer, methylcyclopentadiene-$C_5$ codimer, methylcyclopentadiene dimer, and cyclopentadiene and methylcyclopentadiene trimers and cotrimers, and the like, including mixtures thereof.

In one embodiment, the HPM may be prepared from a monomer mix that can include up to 60 wt % cyclics or more or up to 50 wt % cyclics, by weight of the monomers in the mix. Typical lower limits include at least about 0.1 wt % or at least about 0.5 wt % or from about 1.0 wt % cyclics in the monomer mix. In at least one embodiment, the HPM monomer mix may include more than 5 wt % cyclic components up to 60 wt % cyclics, or preferably up to 55 wt % cyclics, or more preferably up to 50 wt % cyclics, or more preferably up to 25 wt % or 30 wt % cyclics, by weight of the monomers in the monomer mixture from which the HPM is prepared. In particularly preferred embodiments, the HPM monomer mixture comprises from about 10 wt % to about 55 wt % cyclics, or from about 10 wt % to about 30 wt % cyclics, or from about 15 wt % to about 55 wt % cyclics, or from about 15 wt % to about 35 wt % cyclics, or from about 30 wt % to about 60 wt % cyclic components.

In another embodiment, the HPM comprises olefinic unsaturation, e.g., at least 1 mole percent olefinic hydrogen, based on the total moles of hydrogen in the interpolymer as determined by H-NMR. In another embodiment, the HPM comprises from 1 to 25 mole percent aromatic hydrogen, or preferably from 15 to 25 mole percent aromatic hydrogen, or more preferably from 15 to 20 mole percent aromatic hydrogen. Olefinic unsaturation is beneficial to facilitate crosslinking with the elastomer component(s), for example.

The HPMs in one embodiment have a balance of softening point, molecular weights, and molecular weight distribution, for example, Mn from 400 to 2000, Mw/Mn from 1.5 to 4, Mz less than 15,000, a softening point from 40° C. to 160° C., and at least 8 mole percent aromatic hydrogen, based on the total moles of hydrogen in the interpolymer, or preferably, Mn greater than 800, Mw/Mn less than 3, Mz less than 12,000, a softening point of at least 80° C. and/or at least 10 mole percent aromatic hydrogen.

Generally HPMs have a number average molecular weight (Mn) greater than about 200 g/mole, or greater than about 400 g/mole, or greater than about 600 g/mole, or greater than about 700 g/mole, or greater than about 800 g/mole, or greater than about 900, or greater than about 1000 g/mole. In an embodiment the HPM has an Mn between about 400 g/mole and 2000 g/mole, or between about 800 g/mole and 1500 g/mole.

In at least one embodiment, HPMs have a weight average molecular weight (Mw) greater than about 500 g/mole, or greater than about 1000 g/mole, or greater than about 1500 g/mole. In an embodiment, the HPM has a polydispersion index ("PDI", PDI=Mw/Mn=MWD) of 4 or less, or 3 or less. In a particularly preferred embodiment, the HPM has a PDI from about 1.5. The HPM may have a z-average molecular weight (Mz) less than about 15,000 g/mole, or less than about 12,000 g/mole, or less than about 10,000 g/mole. In embodiments, Mz ranges from 2000 to 15,000 g/mole, or from 2500 to 12,000 g/mole, or from 3000 to 10,000 g/mole, or from 3500 to 8,000 g/mole. Mw, Mn, and Mz of the HPMs of the present invention and reported in Table 1 were determined by gel permeation chromatography (GPC) as follows. A Tosoh EcoSEC HLC-8320 GPC system equipped with enclosed Differential Refractive Index (RI) and Ultraviolet (UV) detectors was used with 3 separation columns in the following order: PLgel Sum Mixed-D, 300× 7.5 mm, PLgel 5μ $10^3$ Å, 300×7.5 mm, PLgel 5μ 500 Å, 300×7.5 mm & PLgel 5μ 50 Å, 300×7.5 mm Tetrahydrofuran (THF) was used as an eluent at a flow rate of 1.0 mL/min at room temperature (range of about 20° C. to about 23.5° C.). The GPC samples are prepared by dissolving 24 mg (+/−0.2 mg) of each material in 9 mL of THF. 0.5 μL of Toluene was used as a flow marker. Mw and Mw/Mn data were calculated based on RI calibration with EcoSEC software, prepared using narrow Mw polystyrene standards.

In an embodiment, the HPM can have a softening point of 40° C. to 160° C., or preferably 60° C. to 160° C., or more preferably from 70° C. to 150° C., or more preferably from 80° C. to 120° C. Softening point can be determined according to the Ring & Ball Method, as measured by ASTM E-28.

In an embodiment, the HPM can have a glass transition temperature (Tg) of from about −10° C. to about 110° C., or from about 10° C. to 110° C., or from about 20° C. to 100° C., or from 30° C. to 70° C., or more preferably of from 40° C. to 55° C. Differential scanning calorimetry (DSC) may be used to determine the Tg of the HPM. It is generally known that the relationship between Tg and softening point is as follows: Tg=Softening Point−50° C.

Preferred HPMs have melt viscosity of from 300 to 800 Pa-s (300-800 cPs) at 160° C., or more preferably of from 350 to 650 Pa-s at 160° C. In a particularly preferred embodiment, the HPM has a melt viscosity from 375 to 615 Pa-s at 160° C., or from 475 to 600 Pa-s at 160° C. The melt viscosity may be measured by a Brookfield viscometer with a type "J" spindle, ASTM D6267.

The resins described above may be produced by methods generally known in the art for the production of HPMs, and the invention is not limited by the method of forming the HPM. Preferably the HPM is produced by combining the feed stream in a polymerization reactor with a Friedel-Crafts or Lewis Acid catalyst at a temperature between 0° C. and 200° C. Friedel-Crafts polymerization is generally accomplished by use of known catalysts in a polymerization solvent, and the solvent and catalyst may be removed by washing and distillation. The polymerization process utilized for this invention may be batchwise or continuous mode. Continuous polymerization may be accomplished in a single stage or in multiple stages.

In an embodiment, the preparation method comprises: adjusting the proportions of components in the monomer feed mixture to control the properties of the HPM, e.g., the softening point by adjusting the type or amount of aromatics component or the proportion of the cyclic pentadiene component or the proportion of vinyl cyclohexene or the molecular weight breadth by adjusting the amount of cyclic components, or the like.

In one embodiment, the HPM is not hydrogenated (to retain the olefin unsaturation). In another embodiment, the HPM may be partially hydrogenated. The hydrogenation of the HPM may be carried out by any method known in the art, and the invention is not limited by the method of hydrogenation. For example, the hydrogenation of the HPM may be either a batchwise or a continuous process, e.g., catalytical hydrogenated. Catalysts employed for the hydrogenation of HPMs are typically supported monometallic and bimetallic catalyst systems based on elements from Group 6, 8, 9, 10, or 11 of the Periodic Table of Elements.

Elastomer

One embodiment of the elastomeric composition comprises the hydrocarbon polymer modifier (HPM) described above and at least one elastomer. Additional HPMs useful in the elastomeric composition include, but are not limited to, aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, and hydrogenated rosin esters. In some embodiments, the HPM is hydrogenated. In other embodiments, the HPM is non-polar. As used herein, non-polar means that the HPM is substantially free of monomers having polar groups.

Typical elastomers that may be included in the elastomeric compositions include butyl rubber, branched ("star-branched") butyl rubber, star-branched polyisobutylene rubber, random copolymers of isobutylene and para-methylstyrene (poly(isobutylene-co-p-methylstyrene)), polybutadiene rubber ("BR"), high cis-polybutadiene, polyisoprene rubber, isoprene-butadiene rubber ("IBR"), styrene-isoprene-butadiene rubber ("SIBR"), styrene-butadiene rubber ("SBR"), solution-styrene-butadiene rubber ("sSBR"), emulsion-styrene-butadiene rubber, nitrile rubber, ethylene propylene rubber ("EP"), ethylene-propylene-diene rubber ("EPDM"), synthetic-polyisoprene, general purpose rubber, natural rubber, and any halogenated versions of these elastomers and mixtures thereof. Useful elastomers can be made by any suitable means known in the art, and the invention is not herein limited by the method of producing the elastomer.

The elastomer may or may not be halogenated. Preferred halogenated elastomers may be selected from the group consisting of halogenated butyl rubber, bromobutyl rubber, chlorobutyl rubber, halogenated branched ("star-branched") butyl rubbers, and halogenated random copolymers of isobutylene and para-methylstyrene.

In some embodiments, the elastomeric composition comprises a blend of two or more elastomers. Blends of elastomers may be reactor blends and/or melt mixes. The individual elastomer components may be present in various conventional amounts, with the total elastomer content in the elastomeric composition being expressed as 100 phr in the formulation.

Useful elastomers include isobutylene-based homopolymers or copolymers. An isobutylene based elastomer refers to an elastomer or polymer comprising at least 70 mol % repeat units from isobutylene. These polymers can be described as random copolymers of a $C_4$ to $C_7$ isomonoolefin derived unit, such as an isobutylene derived unit, and at least one other polymerizable unit. The isobutylene-based elastomer may or may not be halogenated.

The elastomer may also be a butyl-type rubber or branched butyl-type rubber, including halogenated versions of these elastomers. Useful elastomers are unsaturated butyl rubbers, such as homopolymers and copolymers of olefins, isoolefins, and multiolefins. These and other types of useful butyl rubbers are well known and are described in RUBBER TECHNOLOGY, p. 209-581 (Morton, ed., Chapman & Hall 1995), THE VANDERBILT RUBBER HANDBOOK, p. 105-122 (Ohm ed., R.T. Vanderbilt Col., Inc. 1990), and Kresge and Wang in 8 KIRK-OTHMER ENCYCLOPEDIA OF CHEMICAL TECHNOLOGY, p. 9340955 (John Wiley & Sons, Inc. 4th ed. 1993), each of which are incorporated herein by reference. Non-limiting examples of other useful unsaturated elastomers are poly(isobutylene-co-isoprene), polyisoprene, polybutadiene, polyisobutylene, poly(styrene-co-butadiene), natural rubber, star-branched butyl rubber, and mixtures thereof.

In an embodiment, the elastomer may be at least one non isobutylene based rubber of types conventionally used in tire rubber compounding, and herein referred to as "general purpose rubber." A general purpose rubber may be any rubber that usually provides high strength and good abrasion along with low hysteresis and high resilience. These elastomers may require antidegradants in the mixed compound if they have poor resistance to both heat and ozone.

Examples of general purpose rubbers include natural rubbers ("NR"), polyisoprene rubber ("IR"), poly(styrene-co-butadiene) rubber ("SBR"), polybutadiene rubber ("BR"), poly(isoprene-co-butadiene) rubber ("IBR"), styrene-isoprene-butadiene rubber ("SIBR"), and mixtures thereof.

The elastomeric composition may also comprise rubbers of ethylene and propylene derived units, such as ethylene-propylene rubber ("EP") and ethylene-propylene-diene rubber ("EPDM"), and their mixtures. EP and EPDM are may also be considered to be general purpose elastomers. Examples of suitable termonomers in making EPDM are ethylidene norbornene, 1,4-hexadiene, dicyclopentadiene, as well as others.

In one embodiment, the elastomer may include a polybutadiene (BR) rubber. The Mooney viscosity of the polybutadiene rubber as measured at 100° C. (ML 1+4, ASTM D1646) may range from 35 to 70, or from 40 to about 65, or in another embodiment from 45 to 60.

Another useful synthetic rubber is high cis-polybutadiene ("cis-BR"). By "cis-polybutadiene" or "high cis-polybutadiene", it is meant that 1,4-cis polybutadiene is used, wherein the amount of the cis component is at least 95%.

The elastomeric composition may also comprise a polyisoprene (IR) rubber. The Mooney viscosity of the polyisoprene rubber as measured at 100° C. (ML 1+4, ASTM D1646) may range from 35 to 70, or from 40 to about 65, or in another embodiment from 45 to 60.

In another embodiment, the elastomer may also comprise a natural rubber. Natural rubbers are described in detail by Subramaniam in RUBBER TECHNOLOGY, p 179-208 (Morton, ed., Chapman & Hall, 1995), herein incorporated by reference. Desirable embodiments of the natural rubbers may be selected from technically specified rubbers ("TSR"), such as Malaysian rubbers which include, but are not limited to, SMR CV, SMR 5, SMR 10, SMR 20, SMR 50, and mixtures thereof. Preferred natural rubbers have a Mooney viscosity at 100° C. (ML 1+4, ASTM D1646) of from 30 to 120, or more preferably from 40 to 80.

In another embodiment, the elastomer may comprise a styrene rubber, such as styrene butadiene rubber ("SBR"), such as emulsion-SBR ("E-SBR"), solution SBR (S-SBR), high styrene rubber (HSR), and the like. Desirable embodiments of the SBRs may have a styrene content from 10 to 60 wt %, such as E-SBR elastomers available from JSR Corporation, which include JSR 1500 (25 wt % styrene), JSR 1502 (25 wt % styrene), JSR 1503 (25 wt % styrene), JSR 1507 (25 wt % styrene), JSR 0202 (45 wt % styrene), JSR SL552 (25 wt % styrene), JSR SL574 (15 wt % styrene), JSR SL563 (20 wt % styrene), JSR 0051, JSR 0061, or the like. Preferred SBRs have a Mooney viscosity at 100° C. (ML 1+4, ASTM D1646) of from 30 to 120, or more preferably from 40 to 80.

The elastomers useful in the invention can be blended with various other rubbers or plastics, in particular thermoplastic resins, such as nylons or polyolefins, such as polypropylene or copolymers of polypropylene. These compositions are useful in air barriers, such as bladders, tire innertubes, tire innerliners, air sleeves (such as in air shocks), diaphragms, as well as other applications where high air or oxygen retention is desirable.

Fillers and Additives

The elastomeric compositions produced in accordance with the present invention typically contain other components and additives customarily used in rubber compounds, such as effective amounts of other processing aids, pigments, accelerators, cross-linking and curing materials, antioxidants, antiozonants, fillers, and/or clays. In addition to HPM the elastomeric compositions may optionally include other useful processing aids, such as, for example, plastomers, polybutene, or mixtures thereof.

In addition to comprising at least one elastomer and at least one hydrocarbon polymer modifier, the elastomeric compositions may also optionally comprise at least one filler, for example, calcium carbonate, clay, mica, silica, silicates, talc, titanium dioxide, aluminum oxide, zinc oxide, starch, wood flour, carbon black, or mixtures thereof. The fillers may be any size and typically range, for example in the tire industry, from about 0.0001 µm to about 100 µm.

As used herein, silica is meant to refer to any type or particle size silica or another silicic acid derivative, or silicic acid, processed by solution, pyrogenic, or the like methods, including untreated, precipitated silica, crystalline silica, colloidal silica, aluminum or calcium silicates, fumed silica, and the like. Precipitated silica can be conventional silica, semi-highly dispersible silica, or highly dispersible silica.

The elastomeric composition may also include clay. The clay may be, for example, montmorillonite, nontronite, beidellite, vokoskoite, laponite, hectorite, saponite, sauconite, magadite, kenyaite, stevensite, vermiculite, halloysite, aluminate oxides, hydrotalcite, or mixtures thereof, optionally, treated with modifying agents. The clay may contain at least one silicate. Alternatively, the filler may be a layered clay, optionally, treated or pre-treated with a modifying agent, such as organic molecules; the layered clay may comprise at least one silicate.

The silicate may comprise at least one "smectite" or "smectite-type clay" referring to the general class of clay minerals with expanding crystal lattices. For example, this may include the dioctahedral smectites which consist of montmorillonite, beidellite, and nontronite, and the trioctahedral smectites, which include saponite, hectorite, and sauconite. Also encompassed are synthetically prepared smectite-clays.

The silicate may comprise natural or synthetic phyllosilicates, such as montmorillonite, nontronite, beidellite, bentonite, volkonskoite, laponite, hectorite, saponite, sauconite, magadite, kenyaite, stevensite, and the like, as well as vermiculite, halloysite, aluminate oxides, hydrotalcite, and the like. Combinations of any of the above discussed silicates are also contemplated.

The layered filler such as the layered clays described above may be modified such as intercalated or exfoliated by treatment with at least one modifying agent. Modifying agents are also known as swelling or exfoliating agents. Generally, they are additives capable of undergoing ion exchange reactions with the cations present at the interlayer surfaces of the layered filler. The modifying agent may be added as an additive to the composition at any stage; for example, the additive may be added to the elastomer, followed by addition of the layered filler, or may be added to a combination of at least one elastomer and at least one layered filler; or the additive may be first blended with the layered filler, followed by addition of the elastomer in yet another embodiment.

In one embodiment, one or more silane coupling agents are used in the elastomeric compositions. Coupling agents are particularly desirable when silica is the primary filler, or is present in combination with another filler, as they help bind the silica to the elastomer. The coupling agent may be a bifunctional organosilane crosslinking agent. An "organosilane crosslinking agent" is any silane coupled filler and/or crosslinking activator and/or silane reinforcing agent known to those skilled in the art including, but not limited to, vinyl triethoxysilane, vinyl-tris-(beta-methoxyethoxy)silane, methacryloylpropyltrimethoxysilane, gamma-aminopropyl triethoxysilane, gamma-mercaptopropyltrimethoxysilane, and the like, and mixtures thereof.

The filler may be carbon black or modified carbon black. The filler may also be a blend of carbon black and silica. In one embodiment, the elastomeric composition is a tire tread or sidewall and comprises reinforcing grade carbon black at a level of from 10 to 100 phr of the blend, more preferably from 30 to 80 phr in another embodiment, and in yet another embodiment from 50 to 80 phr. Useful grades of carbon black include the ranges of from N110 to N990.

Crosslinking Agents, Curatives, Cure Packages, and Curing Processes

The elastomeric compositions and the articles made from those compositions are generally manufactured with the aid of at least one cure package, at least one curative, at least one crosslinking agent, and/or undergo a process to cure the elastomeric composition. As used herein, at least one curative package refers to any material or method capable of imparting cured properties to a rubber as is commonly understood in the industry.

Generally, polymer blends are crosslinked to improve the mechanical properties of the polymer. Physical properties, performance characteristics, and durability of vulcanized rubber compounds are known to be related to the number (crosslink density) and type of crosslinks formed during the vulcanization reaction. Polymer blends may be crosslinked by adding curative agents, for example sulfur, metals, metal oxides such as zinc oxide, peroxides, organometallic compounds, radical initiators, fatty acids, and other agents common in the art. Other known methods of curing that may be used include, peroxide cure systems, resin cure systems, and heat or radiation-induced crosslinking of polymers. Accelerators, activators, and retarders may also be used in the curing process.

The compositions may be vulcanized (cured) by any suitable means, such as subjecting them to heat or radiation according to any conventional vulcanization process. The amount of heat or radiation needed is that which is required to affect a cure in the composition, and the invention is not herein limited by the method and amount of heat required to cure the composition. Typically, the vulcanization is conducted at a temperature ranging from about 100° C. to about 250° C. in one embodiment, from about 150° C. to about 200° C. in another embodiment, for about 1 to about 150 minutes.

Halogen-containing elastomers may be crosslinked by their reaction with metal oxides. Examples of useful metal oxides include, but are not limited to, ZnO, CaO, and PbO. The metal oxide can be used alone or in conjunction with its corresponding metal fatty acid complex (e.g., zinc stearate, calcium stearate, etc.), or with the organic and fatty acids added alone, such as stearic acid, and optionally other curatives, such as sulfur or a sulfur compound, an alkylperoxide compound, diamines, or derivatives thereof.

Sulfur is the most common chemical vulcanizing agent for diene-containing elastomers. The sulfur vulcanization system may consist of an activator to activate the sulfur, an accelerator, and a retarder to help control the rate of vulcanization.

Activators are chemicals that increase the rate of vulcanization by reacting first with the accelerators to form rubber-soluble complexes which then react with the sulfur to form sulfurating agents. General classes of accelerators include amines, diamines, guanidines, thioureas, thiazoles, thiurams, sulfenamides, sulfenimides, thiocarbamates, xanthates, and the like.

Accelerators help control the onset of and rate of vulcanization, and the number and type of crosslinks that are formed. Retarders may be used to delay the initial onset of cure in order to allow sufficient time to process the unvulcanized rubber.

The acceleration of the vulcanization process may be controlled by regulating the amount of the acceleration accelerant, often an organic compound. The mechanism for accelerated vulcanization of natural rubber, BR, and SBR involves complex interactions between the curative, accelerator, activators, and polymers. Ideally, all of the available curative is consumed in the formation of effective crosslinks which join together two polymer chains and enhance the overall strength of the polymer matrix. Numerous accelerators are known in the art and include, but are not limited to, the following: stearic acid, diphenyl guanidine (DPG), tetramethylthiuram disulfide (TMTD), benzothiazyl disulfide (MBTS), N-t-butyl-2-benzothiazole sulfenamide (TBBS), N-cyclohexyl-2-benzothiazole-sulfenamide (CBS), and thioureas.

In one embodiment of the invention, at least one curing agent(s) is present from 0.2 phr to 10 phr, or from 0.5 phr to 5 phr, or in another embodiment from 0.75 phr to 2 phr.

Processing

The inventive elastomeric composition may be compounded (mixed) by any conventional means known to those skilled in the art. The mixing may occur in a single step or in multiple stages. For example, the ingredients are typically mixed in at least two stages, namely at least one non-productive stage followed by a productive mixing stage. The final curatives are typically mixed in the final stage which is conventionally called the "productive" mix stage. In the productive mix stage, the mixing typically occurs at a temperature, or ultimate temperature, lower than the mix temperature(s) of the preceding non-productive mix stage(s). The elastomers, polymer additives, silica and silica coupler, and carbon black, if used, are generally mixed in one or more non-productive mix stages. The terms "non-productive" and "productive" mix stages are well known to those having skill in the rubber mixing art.

In one embodiment, the carbon black is added in a different stage from zinc oxide and other cure activators and accelerators. In another embodiment, antioxidants, antiozonants, and processing materials are added in a stage after the carbon black has been processed with the elastomers, and zinc oxide is added at a final stage to maximize the compound modulus. In a further embodiment, mixing with the clays is performed by techniques known to those skilled in the art, wherein the clay is added to the polymer at the same time as the carbon black. In other embodiments, additional stages may involve incremental additions of one or more fillers.

In another embodiment, mixing of the components may be carried out by combining the elastomer components, filler and clay in any suitable mixing device, such as a two-roll open mill, BRABENDER™ internal mixer, BANBURY™ internal mixer with tangential rotors, Krupp internal mixer with intermeshing rotors, or preferably a mixer/extruder, by techniques known in the art. Mixing may be performed at temperatures up to the melting point of the elastomer(s) used in the composition in one embodiment, or from 40° C. to 250° C. in another embodiment, or from 100° C. to 200° C. in yet another embodiment. Mixing should generally be conducted under conditions of shear sufficient to allow the clay to exfoliate and become uniformly dispersed within the elastomer(s).

Typically, from 70% to 100% of the elastomer or elastomers is first mixed for 20 to 90 seconds, or until the temperature reaches from 40° C. to 75° C. Then, approximately 75% of the filler, and the remaining amount of elastomer, if any, are typically added to the mixer, and mixing continues until the temperature reaches from 90° C. to 150° C. Next, the remaining filler is added, as well as the processing aids, and mixing continues until the temperature reaches from 140° C. to 190° C. The masterbatch mixture is then finished by sheeting on an open mill and allowed to cool.

INDUSTRIAL APPLICABILITY

The elastomeric compositions of the invention may be extruded, compression molded, blow molded, injection molded, and laminated into various shaped articles including fibers, films, laminates, layers, industrial parts, such as automotive parts, appliance housings, consumer products, packaging, and the like.

In particular, the elastomeric compositions are useful in articles for a variety of tire applications, such as truck tires, bus tires, automobile tires, motorcycle tires, off-road tires, aircraft tires, and the like. Such tires can be built, shaped, molded, and cured by various methods which are known and will be readily apparent to those having skill in the art. The elastomeric compositions may either be fabricated into a finished article or a component of a finished article such as an innerliner for a tire. The article may be selected from air barriers, air membranes, films, layers (microlayers and/or multilayers), innerliners, innertubes, air sleeves, sidewalls, treads, tire curing bladders, and the like. The elastomeric composition may be particularly useful in a tire tread.

The elastomeric compositions of the present invention are useful in a variety of applications, particularly pneumatic tire components, hoses, belts, such as conveyor belts or automotive belts, solid tires, footwear components, rollers for graphic arts applications, vibration isolation devices, pharmaceutical devices, adhesives, caulks, sealants, glazing compounds, protective coatings, air cushions, pneumatic springs, air bellows, accumulator bags, and bladders for fluid retention and curing processes. They are also useful as plasticizers in rubber formulations; as components to compositions that are manufactured into stretch-wrap films; as dispersants for lubricants; and in potting and electrical cable filling and cable housing materials.

The elastomeric compositions may also be useful in molded rubber parts and may find wide applications in automobile suspension bumpers, auto exhaust hangers, and body mounts. In yet other applications, the elastomer(s) or elastomeric compositions of the invention are also useful in medical applications such as pharmaceutical stoppers and closures and coatings for medical devices.

EXAMPLES

The hydrocarbon polymer modifiers (HPM), and the elastomeric compositions comprising at least one elastomer and the HPM, will now be further described with reference to the following non-limiting examples.

Aromatic, olefinic, and aliphatic hydrogen content of the hydrocarbon polymer modifiers were determined by proton nuclear magnetic resonance ("H-NMR").

Molecular weight of the hydrocarbon polymer modifiers was determined by gel permeation chromatography, by the test method disclosed herein. The techniques for determining the molecular weight (Mn, Mw, and Mz) and molecular weight distribution (MWD) are generally described in U.S. Pat. No. 4,540,753, which is incorporated herein by reference.

The hydrocarbon polymer modifiers used in the examples are complex copolymers where the copolymer properties can be controlled by the type and amount of monomers included, i.e., the microstructure of the copolymer. Monomer placement in the polymer chain is random leading to further complexity in the polymer microstructure. The hydrocarbon polymer modifiers were prepared from a piperylene component, a C8-C12 component, cyclics, raffinate, and optionally strene/indene, mesitylene, vinyl cyclohexene, and norbornene.

The piperylene component was a mixed stream of cis- and trans-pentadiene-1,3, with about 10-20 wt % cyclopentene, and about 10-20 wt % inert (olefinically saturated or otherwise non-polymerizable) hydrocarbons, and optionally relatively minor amounts (less than 8 wt % each, preferably less than 4 wt % each) of one or more other olefins and diolefins, such as 2-methylbutene-1, 2-methylbutene-2, pentene-1, pentene-2, 2-methylpentene-1, 4-methylpentene-1, 3-methylpentadiene-1,4, cyclopentadiene, hexene-1, hexene-2, hexene-3, and the like.

The cyclics components was a mixed stream of dicyclopentadiene, methylcyclopentadiene (MCPD), and a mixture of other hydrocarbons present at from undetectable or trace levels up to less than 10 wt % individually, such as $C_4$ acyclics, isoprene, cis-pentadiene-1,3, trans-pentadiene-1,3, 2-methylbutene-1, 2-methylbutene-2, pentene-1, cis-pentene-2, trans-pentene-2, ethylbenzene, toluene, xylenes, styrene, cyclopentadiene (CPD), $C_7$ aliphatics, $C_8$ aliphatics, $C_4$ dimer, CPD-butadiene codimers, CPD-piperylene codimers, MCPD dimers, MCPD-butadiene codimers, MCPD-piperylene codimers, CPD-MCPD codimers, trimers of CPD, MCPD, butadiene, piperylene, and combinations thereof.

The C8-C12 components was a mixed stream of about 2 to about 8 wt % styrene, about 10 to about 18 wt % styrene derivatives, about 6 to about 13 wt % indene, about 1 to about 10 wt % indene derivatives, and about 1 to about 3 wt % naphthalene.

The raffinate components was a mixed stream of about 2 to about 5 wt % of n-pentane, about 5 to about 10 wt % of pentene derivatives, about 10 to about 15 wt % of cyclopentene derivatives, about 5 to about 8 wt % of cyclopentane derivatives, about 15 to about 20 wt % of pentane derivatives, about 5 to about 10 wt % of hexane, and about 5 to about 10 wt % of hexane derivatives.

Hydrocarbon polymer modifiers were prepared in a lab scale continuous reactor consisting of 1500 ml glass walled reactor equipped with mechanical agitation, cooling, inlets for feed and AlCl3 catalyst. After the reactor was purged with nitrogen, the feed and catalyst are started to the reactor to maintain an average residence time of 60 minutes with 0.64-0.66 wt % AlCl3 catalyst. The reactor was maintained at 56° C.-58° C. until steady state conditions were achieved after 4 hours. The hydrocarbon polymer modifier was recovered by collecting the reactor product, quenching by addition of a water/isopropyl alcohol mixture followed by water washing steps to remove the residual catalyst. The HPM is then recovered by distilling off any unreacted monomers and solvent under a stream of nitrogen up to 250° C. followed by steam stripping to remove low molecular weight oligomers. The HPMs in this example were prepared with piperylenes, C8-C12 components, and optionally indene, vinyl cyclohexene, norbornene, cyclics, and raffinate. The feed compositions and HPM properties are presented in Table 1.

TABLE 1

HPM Feed Compositions and Properties

| | HPM A | HPM B | HPM C | HPM D | HPM E | HPM F | HPM G | HPM H | HPM I | HPM J | HPM K | HPM L |
|---|---|---|---|---|---|---|---|---|---|---|---|---|
| Piperylenes | 50 | 54 | 58.5 | 63 | 36.5 | 22.5 | 10 | 36.5 | 22.5 | 40 | 29 | 9 |
| C8-C12 | 50 | 42 | 33.5 | 25 | 48 | 45.5 | 43 | 48 | 45.5 | 48.5 | 46 | 41 |
| Indene | | 4 | 8 | 12 | | | | | | | | |
| Vinyl Cyclohexene | | | | | 4 | 8 | 12 | | | | | |
| Norbornene | | | | | | | | 4 | 8 | | | |
| Cyclics | | | | | | | | | | 4 | 8 | 12 |
| Raffinate | | | | | 11.5 | 24 | 35 | 11.5 | 24 | 7.5 | 17 | 38 |
| Yield (%) | 32.5 | 36.3 | 38.9 | 40.1 | 30.0 | 31.0 | 28.1 | 33.0 | 31.0 | 34.0 | 33.4 | 29.3 |
| HPM Softening Point (° C.) | 80.6 | 87 | 91 | 95 | 86 | 90 | 93 | 85 | 88.5 | 84 | 90 | 94 |
| Mn (g/mol) | 878 | 948 | 1066 | 1175 | 802 | 755 | 760 | 877 | 787 | 826 | 809 | 750 |
| Mw (g/mol) | 1540 | 1820 | 2245 | 2492 | 1409 | 1259 | 1113 | 1625 | 1498 | 1600 | 1636 | 1668 |
| Mz (g/mol) | 3196 | 3778 | 4620 | 4803 | 4132 | 3778 | 3446 | 4633 | 4491 | 3817 | 4703 | 5462 |
| Mw/Mn (MWD) | 1.75 | 1.92 | 2.11 | 2.12 | 1.76 | 1.67 | 1.69 | 1.85 | 1.90 | 1.94 | 2.02 | 2.22 |
| Aromatic H | 12.8 | 12.9 | 12.5 | 13.7 | 13.2 | 12.8 | 13.4 | 12.0 | 12.9 | 12.4 | 12.3 | 13.3 |
| Olefinic H | 3.7 | 4.3 | 4.8 | 5.2 | 3.3 | 3.8 | 3.8 | 4.5 | 3.3 | 3.71 | 3.6 | 3.3 |
| Aliphatic H | 83.5 | 82.8 | 82.7 | 81.1 | 83.5 | 83.5 | 82.8 | 83.5 | 83.8 | 83.9 | 84.1 | 83.4 |

The results in Table 1 show the effects of the type and amount of the monomers (indene, vinyl cyclohexene, norbornene) on the softening point and molecular weight distribution of the HPM. HPM-A, having only piperylene and C8-C12 monomers, is the comparative example. The addition of indene monomer to the HPM, as seen in HPM-B, HPM-C, and HPM-D, resulted in a favorable increase in SP but also increased the MWD of the HPM. The inventors appreciate that indene monomer as used in a HPM has this effect on the HPM properties as indene is a rigid monomer than tends to build molecular weight. The addition of norbornene monomer to the HPM, as in HPM-H and HPM-I, resulted in a slightly improved SP but also increased the MWD. Likewise, the addition of cyclics the HPM, as seen in HPM-J, HPM-K, and HPM-L, resulted in a favorable increase in SP but also increased the MWD of the HPM. Accordingly, the HPMs B through L indicate that there is a need for a HPM formulation having increased SP without increasing the MWD.

Table 1 also shows the addition of vinyl cyclobenzene to the HPM, as seen in HPM-E, HPM-F, and HPM-G resulted in a favorable increase in softening point and a favorable lowering of the MWD of the HPM. FIG. 1 shows softening point and z-average Molecular Weight for 4 HPMs have different monomer content. HPM-C has 8 wt % indene, HPM-I has 8 wt % norborene, HPM-K has 8 wt % cyclics, and inventive HPM-F has 8 wt % vinyl cyclohexene. As FIG. 1 depicts, HPM-F has a suitable balance of high softening point without increasing the Mz.

The inventors appreciate that the addition of vinyl cyclohexene monomer as used in the HPM of the present invention has this effect on the HPM properties as vinyl cyclohexene is a flexible molecule which reacts with piperlyenes and forms rings in-situ, thereby increasing SP without unfavorably increasing the MWD.

The invention has been described above with reference to numerous embodiments and specific examples. Many variations will suggest themselves to those skilled in this art in light of the above detailed description. All such obvious variations are within the full intended scope of the appended claims.

We claim:

1. A hydrocarbon polymer modifier, comprising:
    an interpolymer of (i) a vinyl cyclohexene component (ii) a piperylene component; and (iii) a $C_8$-$C_{12}$ vinyl aromatic component; and
    wherein the interpolymer comprises (a) a softening point from 40° C. to 160° C., (b) Mn greater than 400 g/mol, (c) Mz less than 15,000 g/mol, and (d) at least 8 mole percent aromatic hydrogen, based on the total moles of hydrogen in the interpolymer.

2. The hydrocarbon polymer modifier of claim 1, wherein the $C_8$-$C_{12}$ vinyl aromatic component is at least one selected from the group consisting of styrene, indene, and alkyl derivatives thereof.

3. The hydrocarbon polymer modifier of claim 1, wherein the modifier is substantially free of styrene, indene, and norbornene.

4. The hydrocarbon polymer modifier of claim 1, wherein the interpolymer comprises a Mw/Mn from 1.5 to 4.

5. An elastomeric composition comprising the hydrocarbon polymer modifier of claim 1 and at least one elastomer.

6. The elastomeric composition of claim 5, wherein the interpolymer comprises a softening point from 80° C. to 160° C., Mn greater than 800 g/mol, Mw/Mn less than 3, and Mz less than 12,000 g/mol.

7. The elastomeric composition of claim 5 further comprising a raffinate component, wherein the raffinate component is selected from the group consisting of at least one of 2-methylbutene-1, 2-methylbutene-2, pentene-1, pentene-2, 2-methylpentene-1, 4-methylpentene-1, 3-methylpentadiene-1,4, cyclopentadiene, hexene-1, hexene-2, hexene-3, methylcyclopentadiene, and combinations thereof.

8. The elastomeric composition of claim 5 further comprising a cyclic component, wherein the cyclic component is at least one selected from the group consisting of dicyclopentadiene (DCPD)-based polymers, cyclopentadiene (CPD)-based polymers, DCPD-styrene copolymers, $C_5$ homopolymers and copolymer resins, $C_5$-styrene copolymer resins, terpene homopolymer or copolymer resins, pinene homopolymer or copolymer resins, $C_9$ homopolymers and copolymer resins, $C_5/C_9$ copolymer resins, alpha-methylstyrene homopolymer or copolymer resins, and combinations thereof.

9. The elastomeric composition of claim 5, wherein the piperylene component is selected from the group consisting of at least one of trans-pentadiene-1,3, cyclopentene, cis-pentadiene, and mixtures thereof; and wherein the $C_8$-$C_{12}$ vinyl aromatic component is selected from the group consisting of: styrene, ortho-methyl-styrene, meta-methyl-styrene, para-methyl-styrene, alpha-methyl-styrene, beta-methyl-styrene, indene, methyl indene, vinyl toluene, and combinations thereof.

10. The elastomeric composition of claim 5 wherein the at least one elastomer is a diene elastomer.

11. The elastomeric composition of claim 10, wherein the diene elastomer is selected from the group consisting of natural rubber, polybutadiene rubber, polyisoprene rubber, styrene-butadiene rubber, isoprene-butadiene rubber, high cis-polybutadiene, ethylene-propylene rubber, ethylene-propylene-diene rubber, nitrile rubber, butyl rubber, halogenated butyl rubber, branched ("star-branched") butyl rubber, halogenated star-branched butyl rubber, poly(isobutylene-co-p-methylstyrene), brominated butyl rubber, chlorinated butyl rubber, star-branched polyisobutylene rubber, and mixtures thereof.

12. The elastomeric composition of claim 10, wherein the hydrocarbon polymer modifier is miscible with the at least one elastomer.

13. The elastomeric composition of claim 5, wherein the interpolymer is present in an amount of 5 to 50 phr.

14. The elastomeric composition of claim 5, wherein the elastomeric composition is in a tire or tire component.

15. A method, comprising:
    (a) melt processing the elastomeric composition of claim 5 with a cure package to form a curable elastomeric composition in the shape of an article; and
    (b) curing the elastomeric composition to form the article.

16. A method, comprising:
    (a) contacting a monomer mixture of (i) a vinyl cyclohexene component (ii) a piperylene component; (iii) a $C_8$-$C_{12}$ vinyl aromatic component; and (iv) a raffinate component; with (iv) a carbocationic catalyst, to obtain an interpolymer; and
    (b) recovering the interpolymer, wherein the recovered interpolymer comprises a softening point from 40° C. to 160° C., Mn greater than 400 g/mol, Mz less than 15,000 g/mol, and at least 8 mole percent aromatic hydrogen, based on the total moles of hydrogen in the interpolymer.

17. The method of claim 16, where in the $C_8$-$C_{12}$ vinyl aromatic component is at least one selected from the group consisting of styrene, indene, and alkyl derivatives thereof.

18. The method of claim 16, further comprising:
(c) adjusting a proportion of the vinyl cyclohexene component in the monomer mixture to control the softening point of the interpolymer.

* * * * *